United States Patent [19]
Plutowski et al.

[11] Patent Number: 5,682,334
[45] Date of Patent: Oct. 28, 1997

[54] MOTOR START ACCELERATION PROFILE

[75] Inventors: Eugene F. Plutowski; Aimee Willoz, both of Rochester, Minn.

[73] Assignee: Western Digital Corporation, Irvine, Calif.

[21] Appl. No.: 686,748

[22] Filed: Jul. 26, 1996

[51] Int. Cl.$^6$ .................................................. H02P 1/26
[52] U.S. Cl. .......................... 364/565; 318/434; 318/779; 360/73.01; 360/73.03
[58] Field of Search .................................... 364/565, 566, 364/550, 551.01, 556, 553, 571.07; 360/69, 73.03, 73.01; 73/507, 508; 318/431, 434, 778, 779, 66, 696; 388/825, 848; 395/180, 182.03, 183.01, 184.01, 185.01

[56] References Cited

U.S. PATENT DOCUMENTS

| | | | |
|---|---|---|---|
| 4,420,715 | 12/1983 | Lecourtier et al. | 318/301 |
| 4,429,268 | 1/1984 | Yajima et al. | 318/696 |
| 4,684,865 | 8/1987 | Auger | 318/696 |
| 4,714,867 | 12/1987 | Palmin et al. | 318/696 |
| 4,839,754 | 6/1989 | Gami et al. | 360/73.01 |
| 4,879,498 | 11/1989 | Shinohara | 318/254 |
| 5,298,838 | 3/1994 | Peters et al. | 318/779 X |
| 5,399,953 | 3/1995 | Yoshino | 318/799 |
| 5,412,809 | 5/1995 | Tam et al. | 395/750 |
| 5,442,272 | 8/1995 | Schwartz | 318/778 |
| 5,457,365 | 10/1995 | Blagaila et al. | 318/430 |
| 5,466,999 | 11/1995 | Hutsell | 318/431 |
| 5,493,670 | 2/1996 | Douglis et al. | 360/73.03 X |
| 5,510,683 | 4/1996 | Omi et al. | 318/271 |

*Primary Examiner*—Emanuel T. Voeltz
*Assistant Examiner*—Edward J. Pipala
*Attorney, Agent, or Firm*—Schwegman, Lundberg, Woessner & Kluth, P.A.

[57] ABSTRACT

A start-up controller is programmed to continuously monitor the start-up acceleration of a motor using a stored acceleration profile to check the acceleration time against specification limits for the particular motor in which the controller is incorporated. The acceleration profile is an ordinal series of acceleration profile points in which each point is associated with a profile motor speed and a profile elapsed time. The controller terminates the acceleration of the motor if overall time elapsed since the start of acceleration is greater than the profile elapsed time associated with a profile point that is designated by the motor speed.

25 Claims, 3 Drawing Sheets

MOTOR START ACCELERATION PROFILE

FIELD OF THE INVENTION

The present invention is related to electric motors and in particular to the startup acceleration of a spindle motor that spins a hard disk drive assembly.

BACKGROUND OF THE INVENTION

One of the most critical periods in the operation of an electric motor is when it begins to accelerate from a complete stop until it reaches full acceleration ("spin-up"). In order to overcome inertia, the motor demands more power on spin-up than when it is freely spinning after reaching full speed. High power consumption generates a correspondingly high amount of heat which is both wasteful and damaging to thermally sensitive motor components. Furthermore, if the power supply for the motor is capable of supporting the maximum amount of power needed during spin-up, the power supply cannot be optimized for normal operations of the motor. Therefore, most motors contain some type of controller which monitors the amount of power requested by the motor and limits it to a maximum, safe value. And most motor power supplies are chosen to be more efficient during normal operations than during spin-up. A delicate balancing act is required between limiting power to a safe value while not unacceptably increasing the spin-up time of the motor. If a single limiting value for the power is chosen, the motor will not be able to respond to changing conditions in the device it is driving as it spins-up.

The stress on spindle motors for disk drives during the spin-up period is increased because of the condition known as "stiction." Stiction results because the heads of the disk drive tend to stick to the surface of the disk when the disk is inactive. Stiction increases the amount of friction the motor must overcome to begin accelerating the disk and even after the disk has started spinning slowly. Too much stiction can cause the controller of the motor to demand more power than just that necessary to properly spin the disk, i.e., to overcome the inertia of the motor and the disk, and to overcome the friction between the disk and the heads. If the power supply cannot provide sufficient power to the motor, the hard disk drive will not reach full speed and may be damaged as a result of the heads scraping on the surface of the disk as opposed to flying at normal speed. Therefore, monitoring mechanisms have been proposed to determine if the hard disk drive is spinning at an acceptable rate during its critical start-up phase. However, the existing monitoring mechanisms check the motor speed at uniform time intervals despite the fact that the motor speed is more critical at certain portions of the spin-up cycle than others.

What is needed then is a control mechanism that varies the intervals between its speed tests so that problems in the more critical portions of the spin-up cycle can be detected quickly.

SUMMARY OF THE INVENTION

A start-up controller is programmed to continuously monitor the start-up acceleration of a motor using a stored acceleration profile to check the acceleration time against specification limits for the particular motor in which the controller is incorporated. The acceleration profile is an ordinal series of acceleration profile points. Each point is associated with a profile motor speed and a profile elapsed time. The profile elapsed times are defined in terms of overall time elapsed since the start of the acceleration process. The controller terminates the start-up acceleration of the motor if the overall elapsed time is greater than the profile elapsed time associated with a profile point that is designated by actually measuring the motor speed. Periodically the controller designates a different profile point to be used based on an updated motor speed. The frequency at which the motor speed is measured is directly proportional to the motor speed. The controller discontinues its monitoring when the motor reaches full speed.

The profile elapsed times associated with successive profile points, and thus with successive profile motor speeds, differ by varying increments of overall elapsed time. This provides an advantage over the prior art because more time is necessary to achieve an incremental increase in speed when the motor is first starting from a stopped position due to friction than to effect the same incremental increase in speed when the motor is already accelerating. Furthermore, removing the limitation of uniform time increments permits choosing the profile elapsed times to take into account thermal protection of power components in the motor.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

Numbering in the Figures is usually done with the hundreds digits corresponding to the figure number, with the exception that identical components which appear in multiple figures are identified by the same reference numbers. Signals and connections may be referred to by the same number or label, and the actual meaning should be clear from the context of use.

Figure 1:
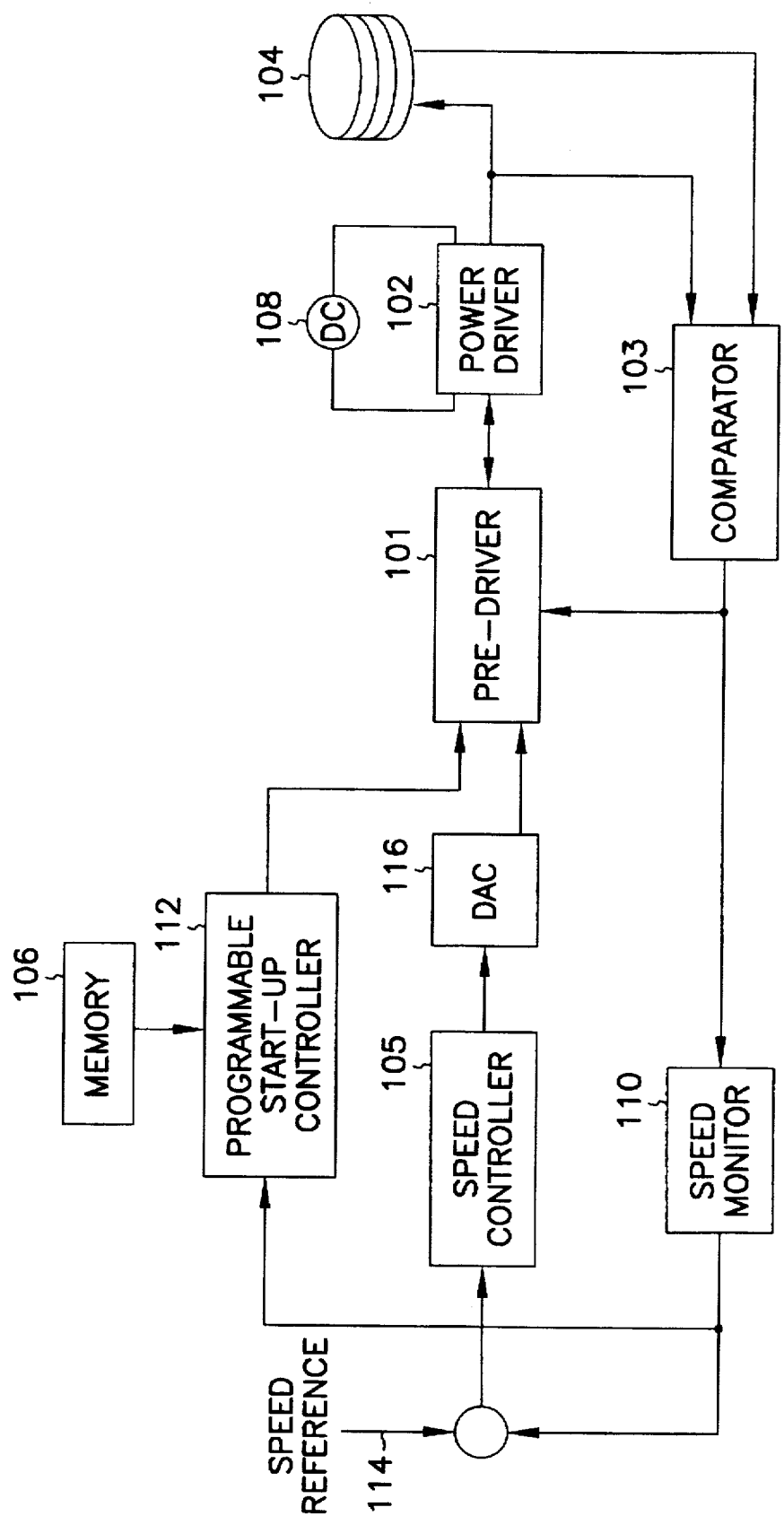
FIG. 1 is a block diagram of a hard disk drive system incorporating a programmable start-up controller that uses a stored acceleration profile to monitor a spindle motor.

FIG. 1 shows a block diagram of a hard disk drive system that incorporates a programmable start-up controller 112 to monitor the start-up (spin-up) acceleration of a spindle motor 104 for compliance with an acceleration profile. The spindle motor 104 is incorporated into a hard disk drive assembly (shown as part of 104) and is used to spin the drive assembly. The motor 104 is powered by a DC power supply 108 that is coupled to the motor 104 through a power driver 102 which controls the power provided to the motor 104. A pre-driver 101 coupled to the power driver 102 determines the amount of power that is supplied to the motor 104 and sets the power driver 102 accordingly. An actual motor speed signal is generated by coupling the motor 104 and the power driver 102 to a comparator 103. A speed controller 105 coupled to a speed reference signal 114 and the comparator 103 generates a reference motor speed signal. The pre-driver 101 is coupled to the speed controller 105 through a digital-to-analog converter (DAC) 116 and to the comparator 103. During normal operations of the hard disk drive system, the pre-driver 101 determines the setting of the power driver 102 by comparing the actual motor speed signal with the reference motor speed signal. The pre-driver 101 adjusts the power driver setting to maintain the actual motor speed in compliance with the speed reference signal 114.

Standard off-the-shelf hard drive controllers include components comparable to the power driver 102, the pre-driver 101, the comparator 103, the speed controller 105, the speed reference 114 and the DAC 116. The arrangement of such components can be different from that shown in FIG. 1 without exceeding the scope of the invention. Furthermore, the blocks in FIG. 1 do not necessarily correspond to actual individual components in a standard drive controller as will be apparent to those skilled in the art.

During start-up acceleration of the motor, the pre-driver 101 sets the power level in accordance with a start-up motor speed signal generated by a programmable start-up controller 112 that is coupled to the pre-driver 101. The programmable start-up controller 112 is coupled to a speed monitor 110 and periodically reads the motor speed measured by the speed monitor 110. The controller 112 is also coupled to a storage medium, shown as a memory 106 in FIG. 1, which holds an acceleration profile specific to the motor 104. The acceleration profile comprises an ordinal series of profile points, with each profile point associated with a profile elapsed time and profile motor speed.

The controller 112 reads the acceleration profile points one at a time from the memory 106 and designates one profile point to use based on the speed measured by the speed monitor 110. The controller 112 then compares the profile elapsed time associated with the designated profile point against overall time that has elapsed since starting the acceleration process. If the overall elapsed time is greater than the profile elapsed time, the controller 112 instructs the pre-driver 101 to set the power level in the power driver 102 to zero so that the motor 104 stops accelerating. The programmable start-up controller 112 also generates an error signal that alerts other components in the system that the disk drive is not accelerating properly so that appropriate recovery routines can be initiated. Examples of recovery routines designed to break the heads loose so that the disk can be spun up are pulsing current to the disk drive actuator and cycling the motor through different states.

If the overall elapsed time is not greater than the profile elapsed time, the controller continues to compare the overall elapsed time against the profile elapsed time on a regular basis. When the controller 112 requests and receives a new speed measurement from the speed monitor 110, the controller 112 reads and designates another profile point based on the new speed and continues to monitor the overall elapsed time for compliance with the profile elapsed time associated with the latest profile point.

The programmable start-up controller 112 can be a programmable device, such as a microprocessor, that is dedicated to the start-up cycle, or it can be incorporated into a programmable device already present in the standard controller depending on the configuration of the standard controller used in the hard disk drive system. The overall elapsed time can be generated using a dedicated timer in the programmable start-up controller 112 or calculated from values available from clocks already incorporated into the standard controller. Other implementations will be apparent to those skilled in the art.

In one embodiment, the measured motor speed designates the lowest profile point in the series which is associated with a profile motor speed that is not less than the measured motor speed. In an alternate embodiment, the measured motor speed designates the highest profile point in the series which is associated with a profile motor speed that is not greater than the measured motor speed. Other alternate embodiments in which the profile points are designated based on other mathematical relationships to the measured motor speed will be apparent to those of skill in the art.

In one alternate embodiment, the speed monitor 110 measures the motor speed in revolutions per minute (RPM). In another alternate embodiment, the speed monitor 110 measures the motor speed in tachometer counts which is inversely proportional to the motor speed measured in RPM. Using a voltage-controlled oscillator to convert back electromagnetic force crossings generated by the motor as it rotates into pulses that can be used as tachometer counts is well-known in the art. Further alternate embodiments in which the speed monitor 110 measures the motor speed in still other time-dependent units will be apparent to those skilled in the art.

Figure 2:
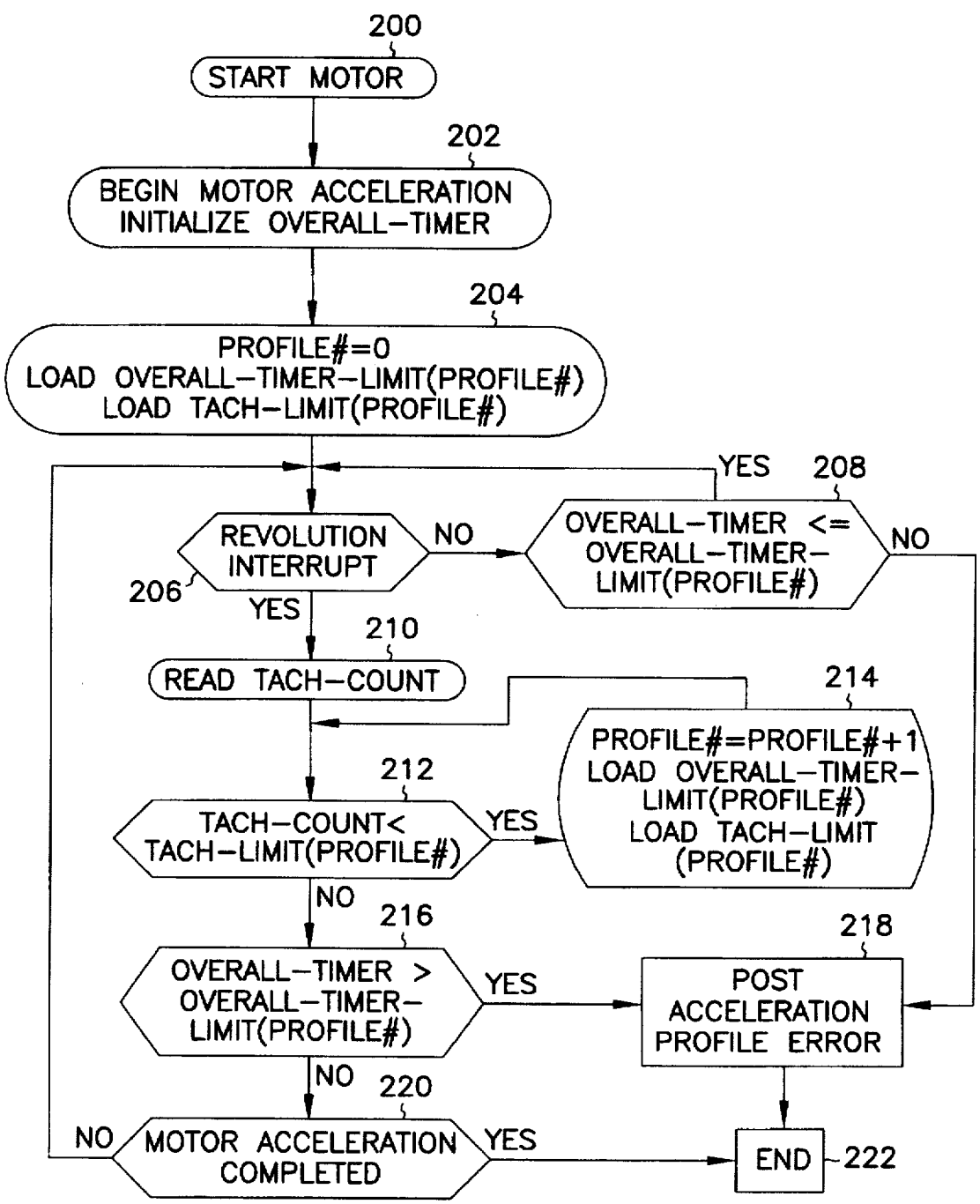
FIG. 2 is a logic flow diagram illustrating an embodiment of the programming for the controller shown in FIG. 1.

FIG. 2 illustrates the logic flow of one embodiment of the programming in the controller 112. Although the logic flow is described in terms commonly associated with a computer software program, the scope of the invention is intended to cover alternate embodiments of the program in various forms such as hardware, firmware, logic circuits and state machines as well as in software. That the logic flow is capable of being expressed in still other alternate embodiments that support logic programming will be apparent to those skilled in the art. Furthermore, the program can be stored on various forms of storage medium, including RAM or ROM memory, floppy disk, hard disk, or can be downloaded into the controller 112 as is commonly done with flash BIOS updates without departing from the nature of the invention.

In the embodiment shown in FIG. 2, motor speed is measured in tachometer counts and the comparison test at decision block 212 in FIG. 2 is structured to perform the monitoring of the acceleration profile point entries in terms of tachometer counts. In alternate embodiments using other measurement units for the motor speed, the comparison test is changed as necessary to convert the logic flow to correspond to the other measurement units.

The acceleration profile comprises an ordinal series of acceleration profile point entries that are stored in memory 106 in the form of a data structure such as a table or data base. Each of the profile point entries in the table contains a profile elapsed time value and a profile motor speed value, and each entry is addressed by its ordinal number in the series. The program keeps track of its place in the series by updating a profile point variable with the ordinal number of the profile point entry last retrieved from memory. That other data structures other than those named above can be used to hold the profile point entries will be apparent to those skilled in the art.

The programming in the controller 112 is initiated when the motor is started (block 200). When the motor begins accelerating, an overall time parameter is initialized that represents overall time elapsed since beginning the acceleration at block 202. In one embodiment, the overall time parameter is generated using a separately designated timer within the disk drive system, while in an alternate embodiment, the overall time parameter is generated by comparing a current time with the time at which the motor began accelerating. Other mechanisms for generating the overall time parameter will be apparent to those skilled in the art.

At block 204, the profile elapsed time value ("overall-timer-limit") and the profile motor speed value ("tach-limit") associated with the first profile point entry ("profile#0") are retrieved from memory 106 by the controller 112. The controller 112 then continuously executes a monitoring loop as described below until an acceleration profile error occurs (block 218) or the motor acceleration is completed (block 220).

The monitoring loop first determines if a periodic interrupt signal ("revolution interrupt") has occurred (block 206). In one embodiment, the revolution interrupt is generated each time the motor completes a revolution. Alternate embodiments in which the revolution interrupt is generated at partial or multiple revolution intervals will be apparent to those skilled in the art. That the periodic interrupt signal can also be generated without reference to the motor revolutions will also be apparent to those skilled in the art.

When a revolution interrupt occurs, the controller 112 reads the motor speed parameter ("tach-count") measured by the speed monitor 110 at block 210. The controller 112 then compares the motor speed parameter against the profile motor speed value at block 212. If the motor speed parameter is greater than the profile motor speed value (i.e., the tach-count is less than the tach-limit of the profile point entry), then the profile motor speed value and the profile elapsed time value associated with the next profile point entry in the ordinal series of acceleration profile point entries are retrieved from memory 106 at block 214. The test block 212 and the retrieval block 214 are repeated as necessary to sequentially retrieve successive profile point entries from memory 106 until a profile motor speed value is retrieved that is greater than the actual speed of the motor represented by the motor speed parameter. The controller 112 then compares the overall time parameter with the profile elapsed time value at block 216.

If more time has elapsed than permitted by the acceleration profile entry last retrieved, the controller 112 posts an acceleration profile error 218 which causes the motor 104 to stop accelerating as described above and the controller program ends (block 222). Other hard drive system components read the acceleration profile error and determine the proper course of action to take next. As noted previously, alternate embodiments in which the profile point entry to use is designated using other mathematical relationships to the motor speed parameter are intended to be included in the scope of the invention, and so are alternate embodiments in which the comparison tests in blocks 208, 212, and 216 employ different mathematical relationships between the quantities being tested.

If the value of the overall time parameter is less than the profile elapsed time value, the controller 112 next determines if the motor acceleration is complete (block 220). If so, then the controller 112 discontinues monitoring the motor speed (block 222). In one embodiment, the controller 112 determines the motor acceleration is complete when the motor speed parameter is no longer less than a full-acceleration speed value. In an alternate embodiment, the motor acceleration is considered complete when the motor speed parameter is greater than the profile elapsed time value associated with the final profile point entry in the series. Other mechanisms which signal the controller 112 that the motor acceleration is complete will be apparent to those skilled in the art.

If the motor acceleration is not complete, controller 112 returns to decision block 206. In between the periodic revolution interrupts, the controller 112 monitors the value of the overall timer parameter at block 208. If the overall elapsed time exceeds the profile elapsed time value, the controller 112 posts an acceleration error (block 218) as described above and exits the program (block 222).

Figure 3:
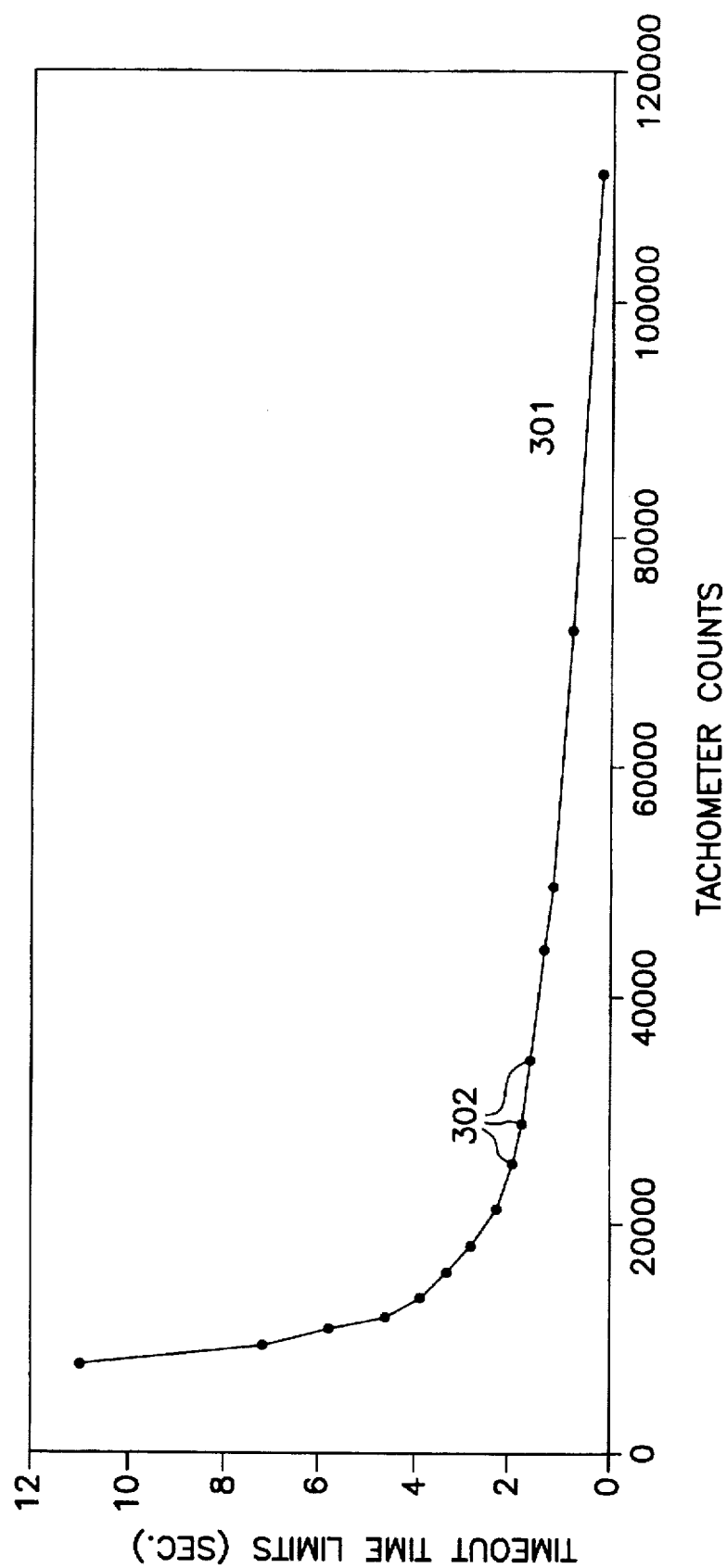
FIG. 3 is a graph illustrating an embodiment of the acceleration profile for the spindle motor shown in FIG. 1.

FIG. 3 is a graph illustrating one embodiment of an acceleration profile used by the controller of FIG. 1. Because models of motors differ in their characteristics, the acceleration profile graph for each model that incorporates a programmable start-up controller 112 will also differ. The curve 301 represents the desired acceleration of a specific model plotted as tachometer counts against maximum allowable elapsed time ("timeout time limits") in seconds. Each model is subject to actual acceleration testing and the results of the tests are correlated to create an acceleration profile graph such as that shown. As will be apparent to those skilled in the art, a computer program that simulated the acceleration of a motor could also generate a profile acceleration graph suitable for use in the invention.

As can be seen in FIG. 3, the increments of overall elapsed time vary between successive profile points 302, shown as dots on the curve 301. After the acceleration profile graph is created, further experimentation determines various locations on the curve 301 to be profile points. The requirements of the hard disk drive system that incorporates the start-up controller 112, such as maximum allowed motor spin-up time and the thermal capacity of the power driver 102, are factored into the decision. Once the profile points 302 are chosen, the values for the profile elapsed time and the profile motor speed associated with each profile point 302 are stored in the acceleration profile data structure in memory 106.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for continuously monitoring start-up acceleration of a motor using a stored acceleration profile having an ordinal series of acceleration profile points, wherein each profile point is associated with a profile motor speed and a profile elapsed time, the method comprising the steps of:

measuring motor speed (210); and terminating the start-up acceleration of the motor (218) when a mathematical relationship (208, 216) exists between the overall time elapsed from start of acceleration and the profile elapsed time associated with the profile point in the series that is designated by the measured motor speed.

2. The method of claim 1, wherein the mathematical relationship (208, 216) exists when the overall elapsed time is greater than the profile elapsed time associated with the designated profile point.

3. The method of claim 1, wherein the measured motor speed designates the lowest profile point in the series which is associated with a profile motor speed that is not less than the measured motor speed (212).

4. The method of claim 1, wherein the step of measuring the motor speed is initiated by a periodic interrupt signal (206).

5. The method of claim 4, wherein a complete revolution of the motor generates the interrupt signal.

6. The method of claim 1, further comprising the step of:
ending the start-up acceleration of the motor when the measured motor speed substantially matches a full-acceleration speed (220).

7. The method of claim 6, wherein the profile motor speed associated with the final profile point in the series is the full-acceleration speed.

8. The method of claim 1, wherein the profile elapsed times associated with successive profile points in the series differ by varying increments of overall elapsed time.

9. A storage medium having a computer program stored therein that causes a suitably configured hard disk drive controller to monitor start-up acceleration of a motor using a stored acceleration profile data structure containing an ordinal series of acceleration profile point entries, the controller continuously performing the steps of:
maintaining an overall elapsed time parameter from start of acceleration (202);
executing a monitoring loop to update a profile point variable based on a motor speed parameter; and
posting an acceleration error (218) when a mathematical relationship (208, 216) exists between the overall elapsed time parameter and a profile elapsed time value associated with the profile point entry identified by the profile point variable.

10. The storage medium of claim 9, wherein the mathematical relationship (208, 216) exists when the overall elapsed timer parameter is greater than the profile elapsed time value associated with the identified profile point entry.

11. The storage medium of claim 9, wherein the monitoring loop comprises the steps of:
retrieving the motor speed parameter from a speed monitor (210);
sequentially retrieving successive profile point entries until a profile motor speed value associated with the profile point entry last retrieved is not less than the motor speed parameter (212); and
assigning the profile point variable the ordinal number of the profile point entry last retrieved (214).

12. The storage medium of claim 9, wherein the controller executes the monitoring loop upon the occurrence of a periodic interrupt signal (206).

13. The storage medium of claim 12, wherein a complete revolution of the motor generates the interrupt signal.

14. The storage medium of claim 12, wherein the interrupt signal is generated at intervals corresponding to partial revolutions of the motor.

15. The storage medium of claim 9, wherein the controller further performs the step of:
exiting the computer program when the motor speed parameter is no longer less than a full-acceleration speed value (220).

16. The storage medium of claim 15, wherein a profile motor speed value associated with the final profile point entry in the series is equal to the full-acceleration speed value.

17. The storage medium of claim 9, wherein the profile elapsed time values associated with successive profile point entries in the series differ by varying increments of overall elapsed time.

18. A hard disk drive system comprising:
a hard disk drive assembly comprising a spindle motor (104), wherein the spindle motor spins the disk drive assembly;
a variable duty cycle power driver (102) coupled to the spindle motor (104) and further coupled to a power supply (108), wherein the power driver controls power supplied to the spindle motor;
a speed monitor (110) coupled to the spindle motor (104) to measure motor speed;
a storage medium (106) having an ordinal series of acceleration profile points stored therein, wherein each acceleration profile point is associated with a profile motor speed and a profile elapsed time; and
a programmable start-up controller (112) coupled to the power driver (102) and the storage medium (106), and further coupled to the speed monitor (110) to monitor start-up acceleration of the spindle motor, wherein the controller terminates the power to the power driver when a mathematical relationship exists between the overall time elapsed from start of acceleration and the profile elapsed time associated with the profile point that is designated by the measured motor speed.

19. The hard disk drive system of claim 18, wherein the mathematical relationship exists when the overall time elapsed from start of acceleration is greater than the profile elapsed time associated with the designated profile point.

20. The hard disk drive system of claim 18, wherein the measured motor speed designates the lowest profile point in the series which is associated with a profile motor speed that is not less than the measured motor speed.

21. The hard disk drive system of claim 18, wherein the speed monitor measures the motor speed upon the occurrence of a periodic interrupt signal.

22. The hard disk drive system of claim 21, wherein a complete revolution of the spindle motor generates the interrupt signal.

23. The hard disk drive system of claim 18, wherein the controller becomes inactive when the measured motor speed substantially matches a full-acceleration speed.

24. The hard disk drive system of claim 23, wherein the profile motor speed associated with the final profile point in the series is the full-acceleration speed.

25. The hard disk drive system of claim 18, wherein the profile elapsed times associated with successive profile points in the series differ by varying increments of overall elapsed time.

* * * * *